Figure 1:
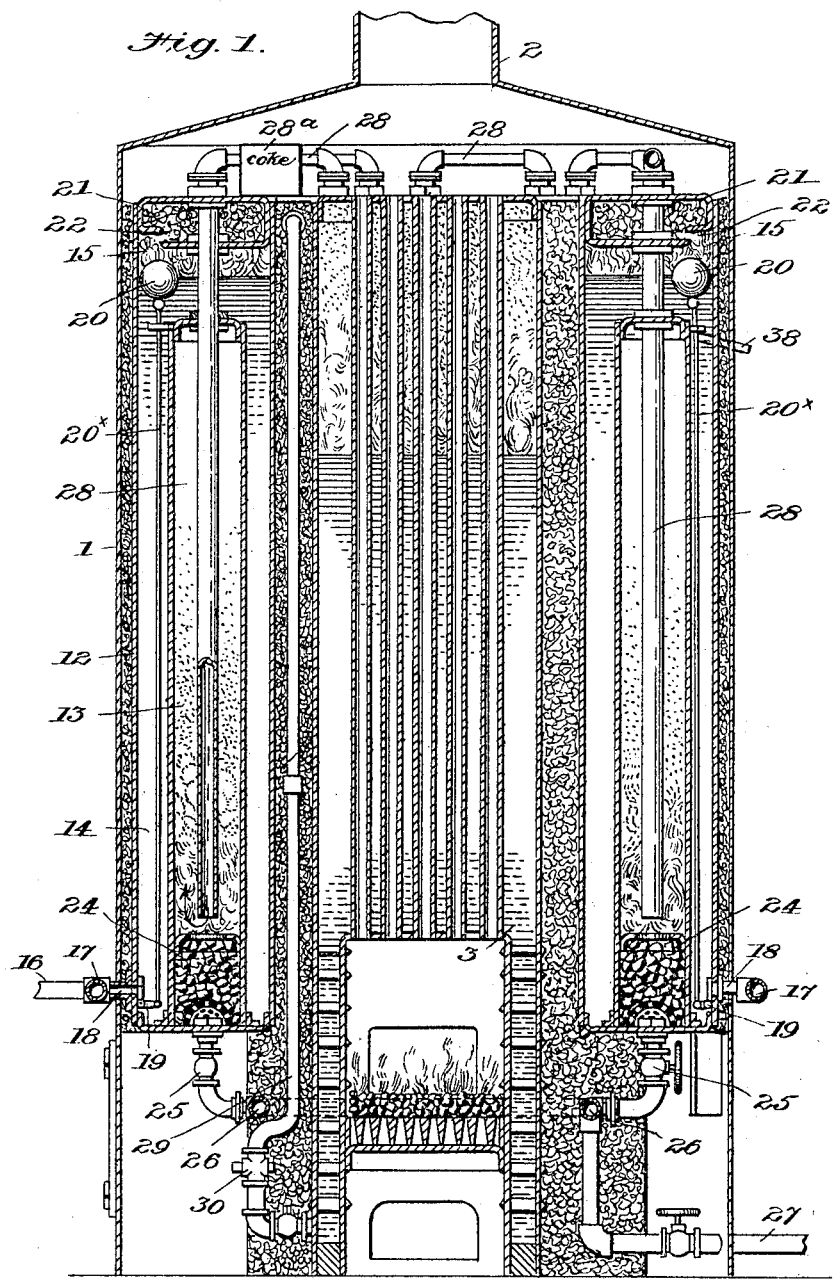

No. 799,002. PATENTED SEPT. 5, 1905.
H. F. HODGES & J. KUEN.
WATER STILL.
APPLICATION FILED MAR. 14, 1902.

5 SHEETS—SHEET 2.

Witnesses.
Edw. W. Vaill Jr
Jno. T. Cross

Inventors,
Horace F. Hodges
and Joseph Kuen
by Horace Pettit
Attorney.

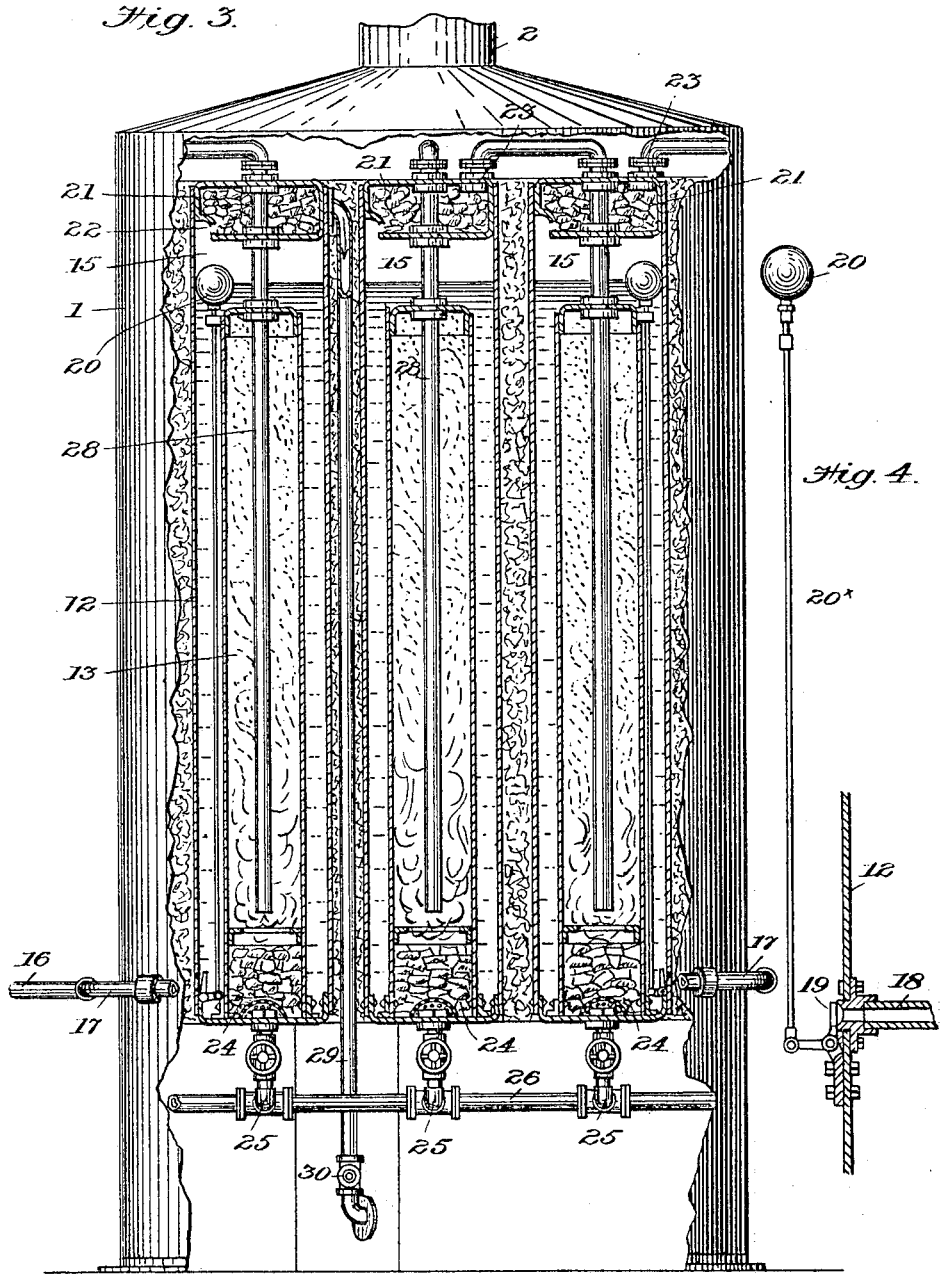

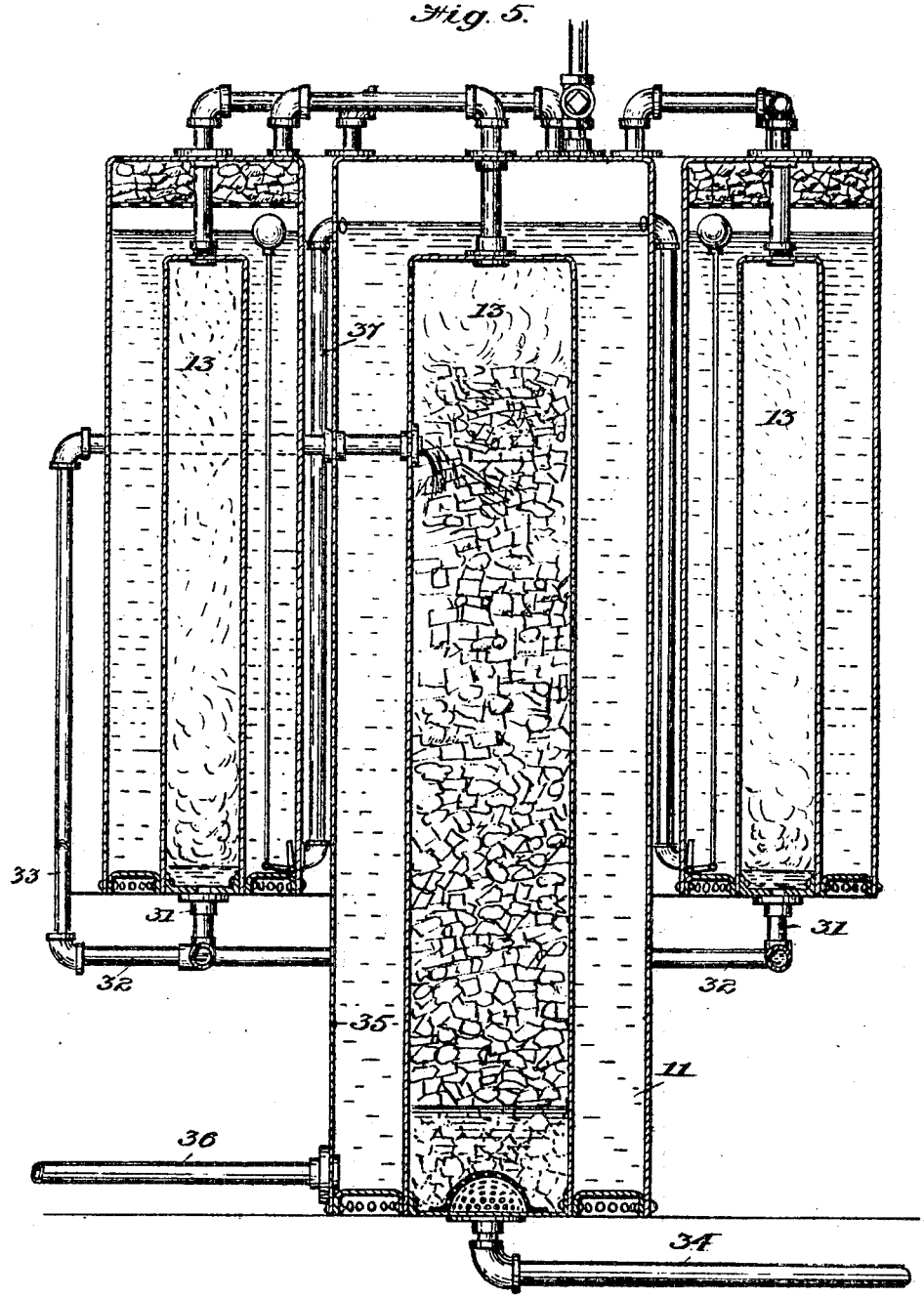

No. 799,002. PATENTED SEPT. 5, 1905.
H. F. HODGES & J. KUEN.
WATER STILL.
APPLICATION FILED MAR. 14, 1902.

6 SHEETS—SHEET 5.

Witnesses.
Edw. W. Vaill Jr.
Gro. F. Cross

Inventors,
Horace F. Hodges
and Joseph Kuen
by Horace Pettit
Attorney.

UNITED STATES PATENT OFFICE.

HORACE F. HODGES AND JOSEPH KUEN, OF PHILADELPHIA, PENNSYLVANIA, ASSIGNORS TO AMERICAN WATER PURIFYING COMPANY, A CORPORATION OF DELAWARE.

WATER-STILL.

No. 799,002. Specification of Letters Patent. Patented Sept. 5, 1905.

Application filed March 14, 1902. Serial No. 98,202.

*To all whom it may concern:*

Be it known that we, HORACE F. HODGES and JOSEPH KUEN, citizens of the United States, and residents of Philadelphia, State of Pennsylvania, have invented certain new and useful Improvements in Water-Stills or Apparatus for Purifying Water by Distillation, of which the following is a full, clear, and exact description, reference being had to the accompanying drawings, forming part of this specification.

Our invention relates to an improved construction of apparatus for the distillation and purification of water, the essential features of which are herein fully set forth.

The principal object of our invention is to provide an apparatus so constructed as to enable us to utilize a primary body of heat to evaporate and purify successive bodies of water in such a manner that the consumption of fuel for this purpose is greatly decreased and the cost of production consequently minimized.

A further object of our invention is to provide an apparatus which will purify water by removing all solid and liquid impurities therefrom and also any noxious or deleterious gases, such as are usually found in waters distilled by the ordinary process, thus enabling us to completely eliminate the flat or bitter taste ordinarily found in distilled waters. This taste is not, as is commonly supposed, due to the absence of air or minerals, but to the presence of gases, as we have repeatedly proved by a series of experiments extending over many years.

We accomplish these objects by submitting the water or steam to a number of distinct but connected steps, as follows: First, the water to be purified is evaporated by any appropriate means and at a pressure and temperature such as the succeeding steps may require; second, the resultant steam is caused to pass through a body of porous or insoluble material, such as Connellsville coke, thus removing any entrained water which said steam may contain and also condensing and holding back certain gases which were generated at high temperatures; third, the steam is condensed in such a manner that its gases are allowed to escape from the condensing-chamber and the surface of the water of condensation or distillate is kept heated to a sufficiently-high temperature to prevent its reabsorbing gases that may enter the condensing-chamber; fourth, passing this distillate at the appropriate temperature through a body of purifying material, such as wood-charcoal, whereby any gases which might have remained in the said distillate will be absorbed and completely eliminated therefrom.

We have found that the distillate produced by our apparatus is rendered absolutely pure and free from vegetable or mineral substances when subjected to all of the well-known tests for the indication of foreign matter in water and that the distillate is also free from the disagreeable features that render water produced by some form of stills objectionable. Said distillate is also improved in taste, and its effect upon the human system is rendered as beneficial as is possible by the use of the purest spring-water.

In order to utilize the heat employed in our apparatus to its fullest extent, we surround a condensing-chamber supplied with steam of considerable pressure with a body of water in an inclosing casing, such water entering at the bottom of said chamber and the said chamber being insulated as perfectly as possible to prevent the escape of heat therefrom. The heat of the steam in the inner or condensing chamber will pass through the walls of said chamber, and thereby cause the water in the surrounding water-chamber to evaporate and form a second body of steam at a temperature and pressure below that of the first body of steam, which latter will be condensed into water. This second body of steam is then led into a second apparatus, similar to that just described, and evaporates water therein at a further slight reduction in temperature and pressure. The said second body of steam is itself condensed, while the new body of steam will enter a third apparatus of similar construction, and so on until the pressure and temperature of the resultant steam can be no further reduced, when the last body of water will only be heated to near its boiling-point, but not evaporated, and this water is forced into the primary steam-generator first mentioned, thus conserving the heat contained therein. It is important that the various generators be insulated as perfectly as possible, so as to prevent the heat from escaping from the apparatus.

Figure 2:
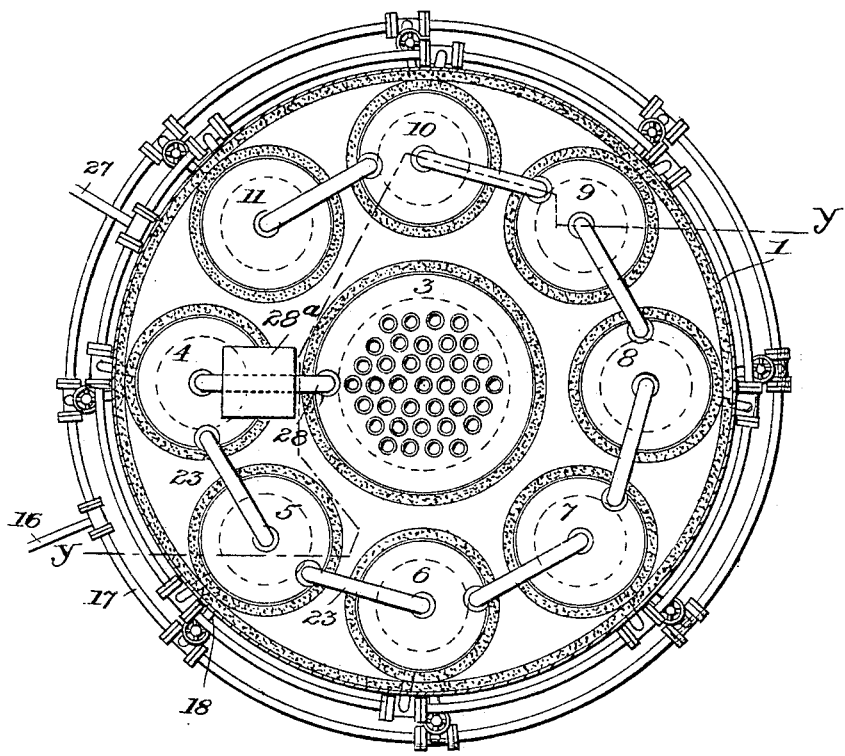
Figure 6:
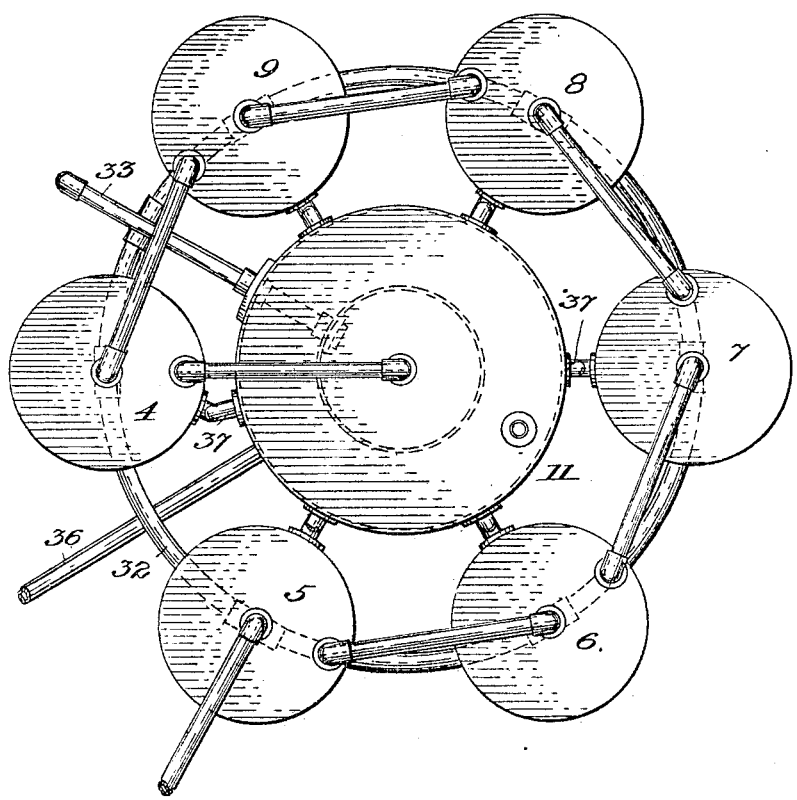

In the accompanying drawings, in which similar numerals of reference are used to indicate similar parts, Figure 1 is a vertical sectional elevation of an apparatus embodying our invention. Fig. 2 is a plan view of the apparatus, showing the top of the casing thereof removed and the casing in section. Fig. 3 is a sectional elevation taken about on the irregular line $y\ y$ of Fig. 2. Fig. 4 is a detail elevation of the valve controlling the inlet of the raw water to the water-chambers. Fig. 5 is a sectional elevation illustrating a slightly-modified form of apparatus. Fig. 6 is a plan view of the apparatus shown in Fig. 5.

In carrying out our invention we provide an outer casing 1, preferably protected from outside radiation by appropriate insulating material, as illustrated. The apparatus is inclosed within the casing 1, and the top of said casing is provided with a suitable pipe or chimney 2, situated over the centrally-located steam-generator 3. The steam-generator 3 may be of any approved construction and is not necessarily located contiguous to the rest of the apparatus. Situated within the casing 1 and around the generator 3 are a plurality of subgenerators 4 5 6 7 8 9 10 11, each of which consists of an outer casing 12 and an inner steam-condensing chamber 13, the water-space 14 being formed between the casing and chamber last named, while the walls of the chamber 13 are shorter than the outer casing 12 and rest, preferably, near the bottom of the said casing 12 to provide a space 15 between said chamber 13 and the upper end of the casing 12. At its lower end the casing 12 of each subgenerator communicates, by means of pipes 18, with a pipe 17, extending around the outside of the casing 1, to which is connected a raw-water-supply pipe 16. The inlet-pipes 18 are controlled by valves 19, operated by floats 20, which are located in the upper end of the chambers 13 and are connected to the valves 19 by means of rods or stems $20^\times$, so that the height of water in the chambers surrounding the condensers is always sufficient to cover said condensers.

At the upper end of each casing 12 above the chamber 13 is located a basket 21, adapted to be filled with coke or other purifying material. The said purifying-basket 21 is provided with suitable apertures, as 22, so that the steam escaping from the chamber 15 may pass through the said basket and its purifying material. A steam-outlet pipe 23 is connected to the top of the coke-chamber 21 and extends to the next generator of the series, as will be hereinafter described. The chambers 13 are provided at their lower ends with purifying-chambers 24, adapted to be filled with wood-charcoal and into which all condensation within the chambers 13 must fall. The bottoms of these chambers 24 are each provided with an outlet-pipe and valve 25, connecting with a common pipe 26, from which pipe distilled water is conveyed by a suitable outlet-pipe 27.

Leading from the steam-space of the generator 3 is a pipe 28, that passes first through a vessel $28^a$, containing coke, and then downwardly through the upper end of the subgenerator 4 and into the chamber 13 thereof, the said pipe terminating, preferably, just above the purifying-chamber 24, and through this pipe steam is supplied to the said chamber. The steam-pipe 23 (best illustrated in Fig. 2 of the drawings) leads from the space above the water in chamber 12 of the subgenerator 4 above the coke-basket 21 to the subgenerator 5 and into the chamber 13 therein in the same manner as the pipe 28 enters subgenerator 4 and for the same purpose. The subgenerator 5 connects in a similar way by means of a pipe similar to 23 with the subgenerator 6, and so on in succession until the subgenerator 11 is reached. The upper space in this latter generator has no coke-basket or regulating float-valve and is connected directly to the primary generator 3 by the pipe 29, having a valve 30, by means of which water is admitted to the said primary generator 3, as required.

In operation water from any adequate supply is admitted to the pipe 16, Fig. 1, at a sufficient pressure and passes by means of the pipes 18 into all of the subgenerators until checked at the proper height by the float-valves 19 and by means of the pipe 29 and valve 30 into the generator 3 until this generator is filled to a proper height, which should be that to allow a sufficient space above the surface of the water to accommodate the steam being evaporated without causing the water to enter the coke-chambers. However, the water should be admitted as high as possible in the generators to get the full effect of the heat and should, of course, completely cover the condensing-chamber. Heat now being supplied to the generator 3 at its fire-box, steam is formed in said generator and passes by means of the pipe 28 through the coke-chamber $28^a$ to chamber 13 in subgenerator 4, where, coming in contact with the walls thereof, submerged by water in the casing 12, it parts with its heat and is condensed into water, the water in casing 12 in turn being gradually heated until it evaporates into steam of a pressure always a little less than that in chamber 13. This second body of steam rises through the coke in the basket 21, whereby any entrained water is eliminated, and thence by way of pipe 23 to the chamber 13 of subgenerator 5, where said steam is similarly condensed and generates a third body of steam from the surrounding water. This last body of steam passes in like manner to subgenerator 6, and the process gradually extends until steam is present at gradually-descending pressures in all of the chambers 13 and evaporating water in all of the casings 12 except that of subgenerator 11, which, as previously stated, supplies heated water for evaporation in the primary generator 3. Meanwhile the condensation of steam has proceeded in the chambers 13 until it has accumulated in the charcoal-chambers 24 and been cooled to near the temperature of the water in the bottom of casings 12, which latter has been steadily flowing in to supply that lost by evaporation from the surface, and said distillate can now be drawn off for use, percolating through the charcoal in chamber 24 as it does so.

The advantage of locating the lower purifying-chamber for the condensed steam adjacent the end of the steam-inlet is that the gases which remain in the distillate after condensation are immediately absorbed by the purifying material before the distillate has an opportunity to cool to any great extent below the temperature of condensation, as would be the case if the distillate-purifying chamber was located at a distance, thereby allowing time and radiation to cause the distillate to cool before passing through the purifying material, for we have found it to be a fact that the gases remaining in the distillate cannot be liberated by a second heating of the distillate after the same has once become cooled below the temperature of condensation. The same is true of the location of the steam-purifying chamber in the upper part of the steam-spaces. The steam is purified while at its highest temperature immediately after genertion and before it has become more moist or saturated through the effects of partial condensation due to heat radiation, and therefore the deleterious gases are more readily absorbed by the purifying material and do not become associated with the more moist steam.

In Fig. 5 we have shown another and equivalent form of this apparatus in which the subgenerator 11 is made much larger than the other subgenerators and the chamber 13 therein nearly filled with charcoal, while this is omitted from the smaller generators. The distillate from subgenerators 4 5 6 7 8 9 is then led by the pipes 31, 32, and 33 to the chamber 13 of subgenerator 11, near its top, and passing through the charcoal therein is drawn off at its bottom by means of the pipe 34. At the same time the water-supply is admitted into the casing 35 of said subgenerator 11 by the pipe 36 and from it distributed by pipes 37 to the other subgenerators after it has been heated by the distillate in the inclosed chamber 13.

The condensing-chambers in all of the above subgenerators are supplied with vent-pipes 38 for the escape of accumulating air and gases therein, it being evident that these pipes may be located at other points than those shown in the drawings. These vent-pipes 38 are of such a size to allow the escape of the small quantity of the gases contained in the condensing-chambers; but the opening is not large enough to materially affect the pressure in said condensing-chamber, and as comparatively low steam-pressures are used there is little tendency for the steam to escape in large quantities. It is obvious that the openings in these pipes may be regulated by suitable cocks.

While we have shown and described a particular form of apparatus, it is evident that various modifications and changes in the details of construction could be made without departing from the spirit and scope of our invention. Hence we do not desire to be limited to the exact construction shown; but

What we claim, and desire to secure by Letters Patent, is—

1. In an apparatus for purifying water, a condensing-chamber, means for condensing steam in said chamber, a conduit for conducting steam into said condensing-chamber, and purifying material located adjacent the end of said conduit for absorbing gases remaining in the distillate while the latter is highly heated.

2. In an apparatus for purifying water, a condensing-chamber, means for condensing steam in said chamber, a conduit for conducting steam downwardly into said condensing-chamber, and purifying material located in the lower end of said condensing-chamber adjacent the end of said conduit for absorbing gases remaining in the distillate while the latter is highly heated.

3. In an apparatus for purifying water, a steam-generator, a plurality of subgenerators, a connection from said steam-generator to one of said subgenerators, connections between said subgenerators, purifying-chambers in the lower portions of each of said subgenerators adjacent the admission ends of said connections, and means for withdrawing purified water therefrom.

4. In an apparatus for purifying water, a steam-generator, a plurality of subgenerators, a connection from said steam-generator leading to a point near the bottom of one of said subgenerators, connections between said subgenerators, purifying-chambers in the lower portions of said subgenerators adjacent the admission ends of said connections and means for withdrawing purified water therefrom.

5. In an apparatus for purifying water, a steam-generator, a plurality of condensers and subgenerators, pipes leading from said steam-generator and from successive subgenerators to points near the bottom of each succeeding condenser, a purifying material in the lower portions of said condensers adjacent the ends of said pipes, water-inlet pipes for said subgenerators, float-controlled valves for said inlet-pipes, and means for withdrawing the purified water from said condensers.

6. In an apparatus for purifying water, a steam-generator, a plurality of subgenerators, condensing-chambers, purifying material in the lower portions thereof, a steam-pipe leading from the main generator to the lower portion of one of said condensing-chambers, steam-pipe connections between the generating-chambers of each subgenerator and the succeeding condensing-chamber, the purifying material being located adjacent the ends thereof, and purifying material in the steam-spaces of said subgenerators.

7. In an apparatus for purifying water, a steam-generator, a plurality of subgenerators, condensing-chambers therein, purifying material in the lower portion thereof, a steam-pipe leading from said generator to the lower portion of one of said condensing-chambers to a point adjacent said purifying material, steam-pipes forming successive communications between the upper portions of the subgenerators and the lower portions of the condensing-chambers, and a pipe leading from the last of the series of subgenerators to the primary generator or other device for the utilization of heat.

8. In an apparatus for purifying water, a steam-generator, a plurality of subgenerators, condensers therein, purifying material in the lower portion thereof, a steam-pipe leading from said generator to the lower portion of one of said condensers, steam-pipes forming successive communications between the upper portions of the subgenerators and the lower portions of the condensers, inlet-pipes for conveying water to said subgenerators, and float-valves for said inlet-pipes.

9. In an apparatus for purifying water, a steam-generator, a non-conducting covering therefor, a plurality of subgenerators surrounding said steam-generator, a non-conducting casing inclosing said generators, a water-supply pipe, branches leading therefrom to the lower portion of said subgenerators, internal chambers in the latter the lower portion thereof containing purifying material, a pipe leading from said steam-generator to one of said subgenerators, successive connection between the steam-spaces of the generating and condensing chambers of the subgenerators, a connection from the last of the series of subgenerators to the lower portion of said steam-generator, and means for withdrawing the purified water from said subgenerators.

10. A plurality of subgenerators, each having internal condensing-chambers, a steam-supply adapted to enter one of said chambers, a steam-space containing purifying material in the upper of said subgenerators, connections between said subgenerators, said connections entering the ends of said subgenerators adjacent the purifying material, and means for maintaining the water in the subgenerators slightly below said purifying material.

11. A plurality of subgenerators, internal steam-condensing chambers therefor, purifying material in the latter for purifying the water of condensation, purifying material in the upper portions of said subgenerators, steam-pipes between each of said subgenerators and condensing-chambers successively, water supplies for said subgenerators, and means for withdrawing purified water from said condensing-chambers.

In witness whereof we have hereunto set our hands this 10th day of March, A. D. 1902.

HORACE F. HODGES.
JOSEPH KUEN.

Witnesses:
ARTHUR E. NITZSCHE,
JNO. T. CROSS.